(No Model.)

S. HARTZELL.
VETERINARY OBSTETRICAL INSTRUMENT.

No. 442,887. Patented Dec. 16, 1890.

Witnesses:
R. H. Orwig
M. P. Smith

Inventor:
Seth Hartzell,
By Thomas G. Orwig, Attorney.

THE NORRIS PETERS CO., PHOTO-LITHO., WASHINGTON, D. C.

UNITED STATES PATENT OFFICE.

SETH HARTZELL, OF AUDUBON, IOWA.

VETERINARY OBSTETRICAL INSTRUMENT.

SPECIFICATION forming part of Letters Patent No. 442,887, dated December 16, 1890.

Application filed April 1, 1890. Serial No. 346,176. (No model.)

*To all whom it may concern:*

Be it known that I, SETH HARTZELL, a citizen of the United States of America, residing at Audubon, in the county of Audubon and State of Iowa, have invented a new and useful Pig-Extractor, of which the following is a specification.

My invention relates to obstetrical instruments, and has for its object the production of a parturition of the fetus of certain kinds of viviparous animals, and is especially designed for use in the delivery of sows that require artificial aid.

My invention consists, primarily, in a tongs having eyelets formed at the free ends of its jaws to receive a cord passed through the said eyelets. Fixed to one end of a rod is a loop surrounding the jaws of the tongs, said rod being provided with a handle.

Figure 1:
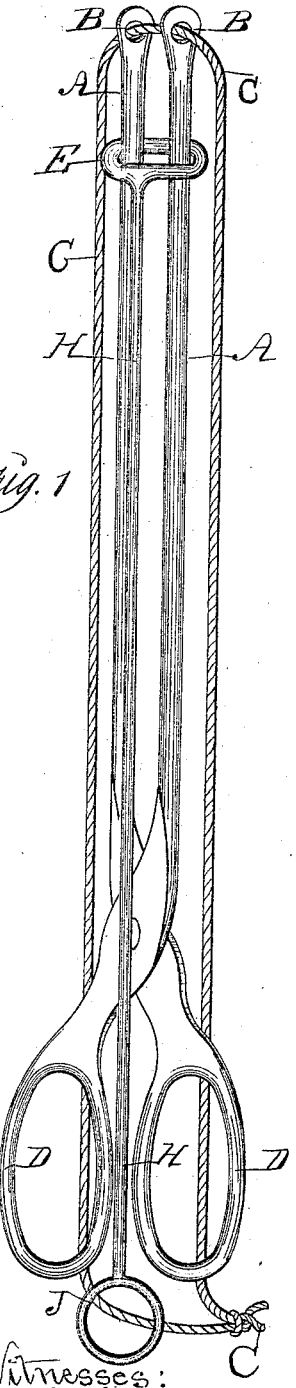
Figure 2:
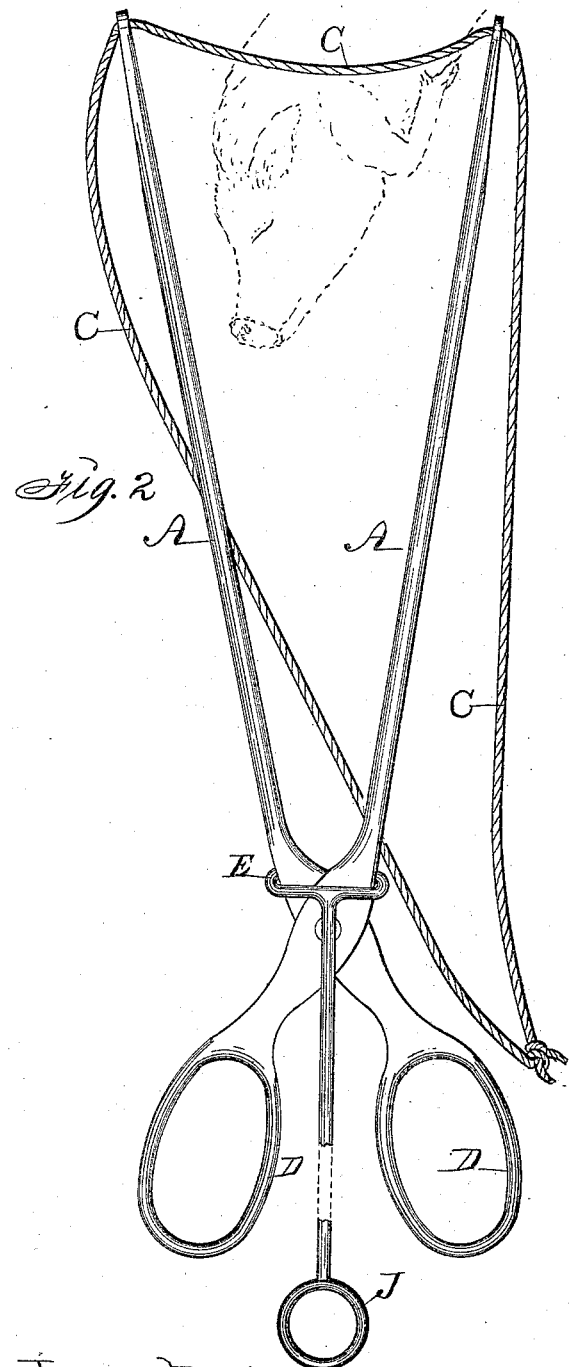

In the accompanying drawings, Figure 1 is a plan view of the tongs, showing the position normally assumed by the parts when the instrument is closed, and when the loop is drawn back to the pivot it will be ready for insertion. Fig. 2 is a plan view showing the position assumed by the parts when the instrument has been inserted and as required to loop the fetus with the flexible cord.

A A are the jaws of tongs having their free ends flattened and perforated to produce eyelets B B, through which is passed the cord C, which extends to the handles D D of the jaws A A, there being a sufficient amount of slack in the cord C, for the purpose hereinafter stated. A loop E formed on the end of a rod H embraces and surrounds the jaws A A, said rod having at its other end a handle J.

It will be seen by reference to Fig. 1 that the forceps are compact in form and adapted to be readily and easily inserted or introduced into the vagina until the fetus at the mouth or within the womb of the animal is reached. The operator then spreads the jaws apart. A partial loop of the cord C is then formed about some portion of the fetus by a half-turn of the instrument by lateral motions or by raising or depressing the same. Then by closing the jaws A A the loop is closed and completed about the fetus. The operator then draws taut the cord C and retaining a secure hold of the same withdraws the instrument from the vagina with the accompanying fetus.

Having thus described my invention, what I claim as new, and desire to secure by Letters Patent of the United States, is—

A pig-extractor consisting of two mating rods, each having a handle at one end and an eye at the other end adapted to admit a flexible cord or strap pivoted together near the ends having the handles, a rod having a loop at one end surrounding the mating rods and adapted to slide thereon, and a flexible cord or strap extended through the eyes in the free ends of the mating rods, to operate in the manner stated.

SETH HARTZELL.

Witnesses:
H. BILHORZ,
H. F. ANDREWS.